(12) United States Patent
Wadell (10) Patent No.: US 6,816,805 B1
(45) Date of Patent: Nov. 9, 2004

(54) COMPUTER GENERATED SCALE AND CONVERSION INSTRUMENT

(76) Inventor: Charles Wilder Wadell, 1060 W. Washington Ave., Santa Ana, CA (US) 92706

( * ) Notice: Subject to any disclaimer, the term of this patent is extended or adjusted under 35 U.S.C. 154(b) by 0 days.

(21) Appl. No.: 10/376,985

(22) Filed: Feb. 28, 2003

(51) Int. Cl.[7] .............................. G01B 3/02; G01B 5/00; G06F 15/00

(52) U.S. Cl. ...................... 702/155; 702/158; 702/161; 702/162; 33/491; 33/784; 33/663; 708/105; 708/171

(58) Field of Search ................................ 702/155, 158, 702/161, 162; 33/1 SB, 1 L, 491, 494, 562, 663, 784; 708/105, 171

(56) References Cited

U.S. PATENT DOCUMENTS

| | | | |
|---|---|---|---|
| 2,156,524 A | | 5/1939 | Christensen |
| 4,158,229 A | | 6/1979 | Woo, Jr. et al. |
| 4,184,261 A | | 1/1980 | Buerner |
| 4,246,703 A | | 1/1981 | Robinet |
| 4,435,904 A | | 3/1984 | Logan et al. |
| 4,707,928 A | | 11/1987 | Bennett et al. |
| 4,839,833 A | | 6/1989 | Parhiskari |
| 4,941,267 A | * | 7/1990 | Miller, Jr. ..................... 33/700 |
| 4,974,164 A | * | 11/1990 | Lewis et al. ................ 702/161 |
| 5,400,513 A | | 3/1995 | Duffield |
| 5,822,875 A | * | 10/1998 | Feldner ....................... 33/494 |
| 5,896,671 A | | 4/1999 | Yu |
| 6,223,136 B1 | * | 4/2001 | Geiger ....................... 702/158 |

* cited by examiner

Primary Examiner—Kamini Shah (57) ABSTRACT

The present invention relates to a process and method for printing, utilizing a computer and computer printer, a scale instrument and conversion tool to be used in preparing and interpreting scaled drawings, maps, aerial photographs, graphs and similar documents. The instrument can be printed on paper, plastic film, or any flexible media capable of being processed by a computer printer.

The invention includes a sub-process to not only print a scale denominated in the various scales typically used in preparing scaled drawings, etc., but also to print a scale denominated in any other scale to be used in interpreting a drawing, etc., which is not longer presented in the original scale due to reproduction, shrinkage, enlargement, or reduction. The invention process also includes sub-processes to: calibrate the process to compensate for differences in the manner which various individual printers respond to computer instructions, mathematically calculate scales based upon user input of the actual length of a line in a drawing and the distance represented by that line, and print conversion tools used to convert distances on a drawing from one system of measurement to one or more alternative measurement systems based upon a mathematical relationship between the linear distance in the drawing the alternative system(s).

5 Claims, 5 Drawing Sheets

COMPUTER GENERATED SCALE AND CONVERSION INSTRUMENT

CROSS-REFERENCE TO RELATED APPLICATIONS

BACKGROUND

1. Field of Invention

The present invention relates to the use of a computer and computer printer to print a scale and/or conversion instrument used to prepare and interpret scaled drawings, maps, aerial photographs, graphs and similar documents. In it's major embodiment, the present invention particularly relates to the fast and economical production of a scale instrument which is matched or calibrated to the same scale as a drawing, map, graph, or similar document, the scale of which has been enlarged or reduced from the original; or to the same scale as an aerial photograph or other image which has not been printed at a specific predetermined scale. The tasks performed with this scale instrument would otherwise be more costly and subject to significant error because of the time and care necessary to fabricate, on a case by case basis, a manually produced scale instrument which matches the scale of each of such documents. The instruments printed by the present invention also can be calibrated in the same scales as the engineer's and architect's scale instruments typically used for producing scaled drawings of all types, In other embodiments, the present invention can also produce a conversion instrument denominated in a different measuring system than that used to produce the drawing, thus allowing the easy conversion to alterative systems of measurement such as from the English system to Metric. The process also can produce an instrument containing one or more scales which allows the conversion, without additional measurement or calculation, of units of distance into units of another system such as area units or monetary units, or into units of any other measuring system where the total units in such system has a direct relationship with the total distance measured on the drawing. As one example, the process can print a scale instrument to be used in estimating the acreage in a 100 foot wide railroad right of way using a map scaled at 1"=154'. In such an instrument, each linear inch would be equivalent to 15,400 square feet or 0.35 acres, and the one acre index mark would be 2.83 inches from the "0" index mark, the two acre index mark would be 5.66 inches from the index and so on, with intermediate index marks between such major index marks. Such an instrument can be printed with one or more scales which can be used by folding the media along the base line of each such scale so that the base line can be placed on and manipulated across the drawing. Continuing the example, if land in the area shown by the map were worth $10,000 per acre, the value of land within the right of way could be estimated with a scale instrument denominated in dollars per acre. In this case, a mark at 2.83 inches from the index would also indicate that the dollar value of land in a corridor 100 feet wide extending from the index mark to that point is equal to $10,000. Such dollar denominated index marks would be extended along the scale, together with intermediate index marks. In addition, the scale instrument can be printed on media which was flexible enough to be folded and unfolded such that multiple scales could be printed on one sheet of media, one indicating, for example, distance, another acreage, and yet another dollar value so that each of these factors could be read with the same instrument by folding and unfolding the printed media so as to expose the appropriate scale. It is obvious that there are many more examples of situations where the instrument can be used in determining useful information which is mathematically correlated to a distance within scaled drawings, maps, aerial photographs, graphs and similar documents.

2. Description of Prior Art

Cartographers, architects, engineers, and others have traditionally prepared drawings which graphically represent full sized objects by a process in which a dimension measured on the full sized object is represented by a fraction or multiple of that measurement on the drawing. The mathematical relationship between the two units is generally known as the "scale." Different professions use different measurement systems and label their scale instruments differently (e.g. cartographers may indicate scale as 1"=1 mile, or 1:25,000, engineers may use 1"=40', architects may use ¼"=1', etc.). Scale instruments to assist the drafting and interpretation of scaled drawings, etc. are well known to those who practice the art. One of the most common is a triangular scale instrument constructed of wood, plastic, metal, or similar material which features six faces, each denominated in a different scale. Such scale instruments are manufactured with scales commonly used by civil engineers, scales commonly used by architects, and metric scales. Flat ruler-like instruments with one or two common scales are also available in various configurations. More recently, CAD (Computer Assisted Drafting) programs have all but eliminated the need for the use of a scale instrument in the preparation of many scaled drawings since that functionality has been integrated into the CAD programs. Scale instruments, however, continue to be employed extensively by users of scaled drawings, maps, aerial photographs, graphs and similar documents.

Recent technology has allowed drawings, etc., which have been created on one size of media to be readily converted to another size, often via other media such as microfilm or computer image files. Thus, drawings and maps prepared and plotted on large sheets of paper are regularly reduced to 11"=17" or 8½"=11" or other size sheets of media by such means as changing the print parameters in a CAD program, scanning a document and converting the image into a computer file, or publishing the drawing in proprietary computer file formats such as Adobe Corporation's Acrobat program. Modern office copiers have the ability to shrink or enlarge an image. While the scale of the drawings is changed by such actions, normally the relative spatial relationship between the vertical and horizontal dimensions of the drawing remains intact. Therefore, where the length of one dimension in the full sized object is known, the length of the corresponding line in the revised drawing can be measured and the revised scale ratio determined by calculation as follows:

Revised Scale=Distance Represented by the Line/Measured Length of a Drawn Line

Knowing the revised scale ratio, the user can determine the length of any dimension in the full sized object by measuring the corresponding dimension in the revised scale drawing and solving the equation as follows:

Distance Represented by the Line=Measured Length of a Drawn Line * Revised Scale Even in those cases where the vertical and horizontal dimensions are changed by differing amounts, the user can determine the new scale for lines on the x axis, for lines on the y axis, and for lines having various bearings between the x and y axes with the number of additional scale instruments being interpolated based on the need for accuracy.

Where the reduction or enlargement of the drawing is an exact multiple of the original scale, a common scale instrument calibrated in that multiple of the original can be used to read distances represented by lengths of the various lines on the drawings. For example, if a drawing in which 1"=200" is reduced from 22"=34" to 11"=17", a factor of one half, a scale instrument calibrated at 1:40 can be used to interpret the drawing. However, since the most common scale instruments using these units of measurement are denominated in 1:10, 1:20, 1:30, 1:40, 1:50, and 1:60, a drawing prepared such that 1"=40" and which has been reduced by half cannot be as easily interpreted with the common instrument. In practice, it is typical to use the 1:40 scale on the common scale instrument and double the reading, either mentally or by the use of actual calculations. However, this practice slows the user and error can be introduced.

These difficulties become much more pronounced when the size of the drawing is changed by an uneven factor which typically occurs when, for example, a drawing is microfilmed and then a print is made from the film, or when a computer image or portion of a computer image is printed. Moreover, the image may be reprinted in a different media size than the original. These practices lead to situations where, for example, a drawing originally prepared in a scale of 1"=40' will end up with a scale of, say, 1"=724' or some other uncommon scale. No commercially available scale instrument is calibrated in this denomination nor would it be calibrated in the many various other uncommon scales which would be necessary to match other reduced scale drawings. To interpret such a drawing, a careful artisan must first determine the scale as indicated above, and then calculate the length of 10 units or 100 units or some other convenient measure and mark off multiples such units on the edge of a paper, wooden stick, or other convenient media. If prepared accurately, this ad hoc scale instrument can be used to estimate the real world dimensions lines shown on that specific drawing. However, this is a tedious exercise with significant potential for error, especially if many such instruments need to be constructed to match a variety of scales on many different drawings. The difficulties are increased when three or more such instruments must be constructed to measure distances in drawings which have different scales on the x and y axes because of shrinkage (one instrument for the x axis, one for the y axis, and one or more instruments (depending on the accuracy required) to be used in estimating lines which are not parallel to either the x or y axis. Thus, the relevant fields of art includes not only instruments in the common scales, but instruments which yield the same functionality for drawings, etc., with uncommon scales.

A number of mechanical improvements on common scale design have been developed. Bennett et al.'s Variscale (U.S. Pat. No. 4,707,928) contains 17 scales which can be denominated in a variety of scale ratios. While having more scales at hand is an advantage over the common triangular scale instrument's six, this and other similar improvements are of little use when the drawing has been reduced or enlarged to an uncommon or uneven scale, such as 1"=724'. The computer generated scale invention provides a far greater variety of scales, limited only the ability of the computer printer to produce a line distinct from an adjacent line on the media.

Christiansens's Variable Scale (U.S. Pat. No. 2,156,524) represents a mechanical approach to the problem of working with drawings with diverse and uncommon scales. While it has some functionality with these drawings, it is inherently not as accurate as the subject invention in determining the actual scale. The user of the Christiansen device must interpolate from scales notations marked on the sides of the device's movable ribbon. In addition, it is physically more cumbersome than the invention and is subject to wear in use and resultant inaccuracy. Additional potential for error accrues if the user desires to compare or modify one drawing based upon data from other drawings, when more than one is at an uncommon scale. This common task requires the practitioner to measure on one or more drawings and transfer information to the final drawing, sometimes moving back and forth between various drawings several times to plot data. Christiansen's device requires that it be re-calibrated for each such drawing by laying it against a line in the drawing and matching the known length of the line in the real world to the applicable mark on the instrument. The current invention prints scale instruments in the exact scale necessary so that the same instrument with the exact same scale can be used with the specific drawing each time it is needed.

Yu's Universal Scale (U.S. Pat. No. 5,896,671) can be used to determine distances on a scaled drawing which has an uncommon scale, albeit with considerable manipulation. This device does not allow the direct reading of distances on a scaled drawing, rather requiring that the user determine the number of major and minor index lines which are crossed when the device is laid out along a line which is to be measured. Then the user must determine the distance represented by each of the major and minor lines, ascertain the number of major lines crossed and the number of minor lines crossed after the final major line, and then multiply the number of major lines by the distance they represent and the number of minor lines by the distance they represent and add the two sums. This process is time consuming, cumbersome and the potential for error is not insignificant. Like Christiansen's Variable Scale, this device must be recalibrated for each drawing which is analyzed and must be set and reset when working with two or more drawings with uncommon scales at the same session.

Duffield's Image Size Measuring Device (U.S. Pat. No. 5,400,513) is a mechanical device for estimating the size an object in medical diagnostic images in which objects are not shown at their true size. It's operation is based on the knowledge of the true size of at least one object in the image. It's simplicity of operation in the primary embodiment is offset by the fact that considerable interpolation is required. An alternative embodiment allows a more accurate estimate, but with the disadvantage of requiring that the user hold movable parts of the device together as it is transferred from one object to another. This requires dexterity and introduces considerable potential for error. In addition, accurately estimating the size of an object which is significantly larger than the index object would require that the device be physically large. Since there is no conceptual difference between a medical diagnostic image in which the actual size of one object is known, and for example, an aerial photo in which the true dimension of at least one object is known, the present invention allows more accurate estimate of size without the disadvantage of moveable parts which can be inadvertently displaced.

More recently developed are several electronic devices (Woo, Jr. et al., Electronic Rule For Precise Distance Measurement And Distance Setting, U.S. Pat. No. 4,158,229; Parhiskari Programmable Display Engineering Scale, U.S. Pat. No. 4,839,833) and electromechanical devices (Buerner, Multipurpose Drafting And Measuring Instrument, U.S. Pat. No. 4,184,261, Robinet, Electronic Drafting Instrument With Digital Readout Of Displacement, U.S. Pat. No. 4,246,703; Logan et al, Automated Measuring Scale, U.S. Pat. No. 4,435,904) which can be used to prepare, modify, and interpret drawings at uncommon scales. When working with uncommon scale maps, each of these devices has one or more deficiencies relative to the present invention. First, all are inherently more expensive to manufacture than the present invention. Second, they can be presumed to be more prone to failure and/or damage because of the nature of their materials and construction. Third, none have the advantage of the subject invention when the user needs to measure a distance or distances in one or more drawings which have irregular scales and transfer such distance information to another drawing which also may have an irregular scale. In that case, the unique and irregular scales must be ascertained and entered each time the instrument is used on another drawing. It is clear that recalibrating the scale for each separate operation is time consuming and introduces considerable potential for error. The present invention deals with this problem by printing a new sheet of media with a scale set at the irregular scale for a particular drawing, which sheet will be used each time data from that drawing needs to be obtained. Moreover, it is possible to write identifying information on the media and/or to allow the user to label the media from the computer user interface. With many types of media, the user can to make pencil marks on the sheet to show the extent of a line, thus creating the ability to verify the interpretation of the data. As an auxiliary benefit of the subject, the media sheets can be readily stored with the drawing in a file so they are available for future use and allow continuity between uses in a precise manner. Also, the scale instruments created by the subject invention can be readily carried to the field and used under adverse working conditions. This is not true of the electro-mechanical devices which need to maintain precise contact with the drawing to maintain accuracy. Finally, the Parhiskari device anticipates the use of a relatively few number of pre-defined scales.

SUMMARY

The present invention uses a computer and printer to produce scale instruments denominated in a variety of scale ratios. Such instruments are especially useful for interpreting scaled drawings, maps, aerial photographic, graphs, etc. which are not to one of the commonly used scale ratios.
Object and Advantages The principal object of the invention is to provide a means, using a computer and computer printer, to generate a printed scale instrument in a large variety of scales to be used in interpret scaled drawings, maps, aerial photographic, graphs, etc. which have an internally consistent scale which is uncommon and which is not one of the scales typically used by practitioners. Inherent in the invention is a mechanism to calibrate the program to a variety of computer printers, a routine to quickly and easily calculate the inherent scale based on data within the document, the ability to use the printed scale instrument as a tool to convert lengths on a drawing in one measurement system another measurement system, and the ability to create scale instruments having multiple scales denominated in alternative systems when the printed media is transparent or can be folded.

REFERENCE NUMBERS IN DRAWINGS

| | | | |
|---|---|---|---|
| 20 | Print media | 21 | Printed Instruction |
| 22 | Lines generated by printer | 23 | Printed value of scale ratio and instructions |
| 24 | Linear distance of ten units | 25 | Area available for printed instructions, labels, advertising, etc. |
| 26 | Line indicating one tenth of the linear distance of ten units | 28 | Line marking the five-tenths position |
| 30 | Base line | 32 | Index line |
| 34 | Index Number "0" | 36 | Available Horizontal Media Distance |
| 38 | Calibration Line | 40 | Step II Calibration Line |
| 50 | Start Program | 51 | Choose Operation |
| 52 | User Data Input | 53 | Close Program |
| 54 | Calibrate Program Module | 55 | Calibration Complete Status |
| 56 | Determine If Previously Calibrated | 57 | Calculate Scale Ratio Module |
| 58 | Program Stopped Status | 59 | Normalize Scale Module |
| 60 | Build Image/Print Module | 61 | Display Scale Ratio Output |
| 62 | Printed Scale Output | | |
| 80 | Calculate Scale Button | 81 | Print Scale Button |
| 82 | Calibrate Program Button | 83 | Clear Button |
| 84 | Exit Button | 85 | Measured Distance Entry Window |
| 86 | Known Distance Entry Window | 87 | Display Scale Window |

DESCRIPTION

The method and process is based on the ability of electronic computers to manipulate variables mathematically and to issue instructions to a printer peripheral as to where lines 22 will be placed on the print media surface 20. While this method and process was developed to run on a computer system using one of the Microsoft Corporation's Windows™ platforms and was programmed using the Microsoft Corporation's Visual Basic™ program, it could be developed by a competent practitioner of the art of computer programming to work on any computer, running any other operating system, in any programming language capable of manipulating variables and directing output to a printer peripheral in such a manner that the drawing of lines at regular, close, controlled, and varying intervals can be accomplished. The method and process is further based on the fact that, as indicated above, if one knows the distance in the actual world which is represented by a given line in a scaled drawing, etc., and if one knows the length of that line, one can calculate the ratio between the two distances to determine the scale ratio.

Figure 4:
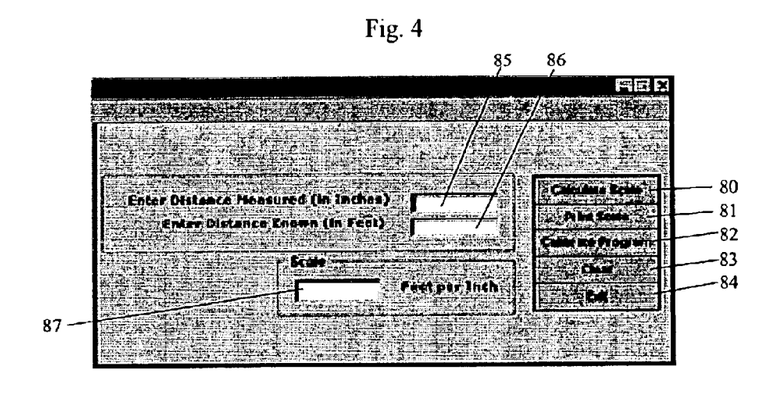
FIG. 4 shows an embodiment of a user interface.
Figure 5:
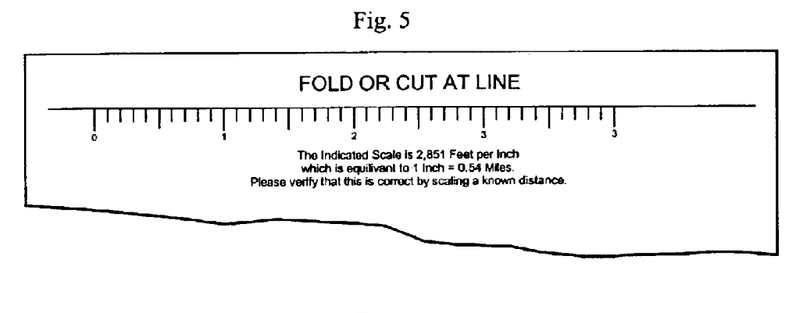
FIG. 5 shows a portion of another typical scale instrument which has been printed by the method and process. It has a scale of 1 inch=0.54 miles but could have been produced in a variety of scale ratios.
Figure 6:
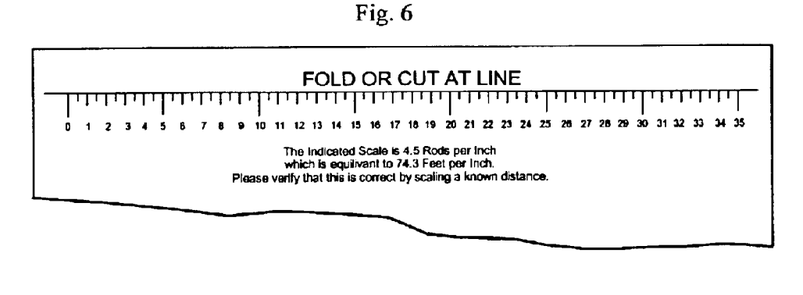
FIG. 6 shows a portion of another typical scale instrument which has been printed by the method and process. It has a scale of 1 inch=4.5 rods but could have been produced in a variety of scale ratios.
Figure 7:
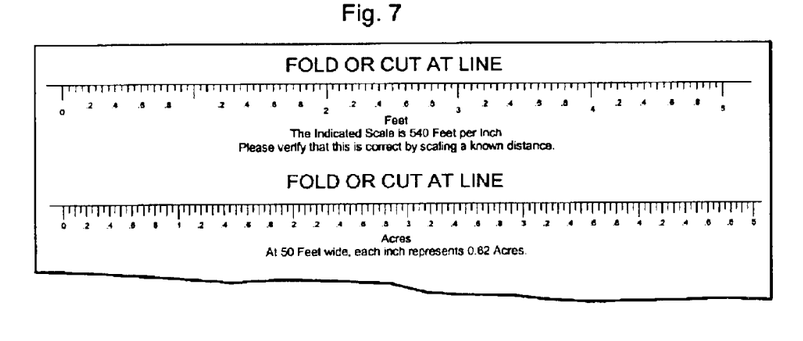
FIG. 7 shows a portion of another typical scale instrument and conversion tool which has been printed by the method and process. It has a scale of 1 inch=540 feet on the upper scale and 1 inch=0.62 acres on the lower scale. It could have been produced in a variety of scale ratios.
Figure 8:
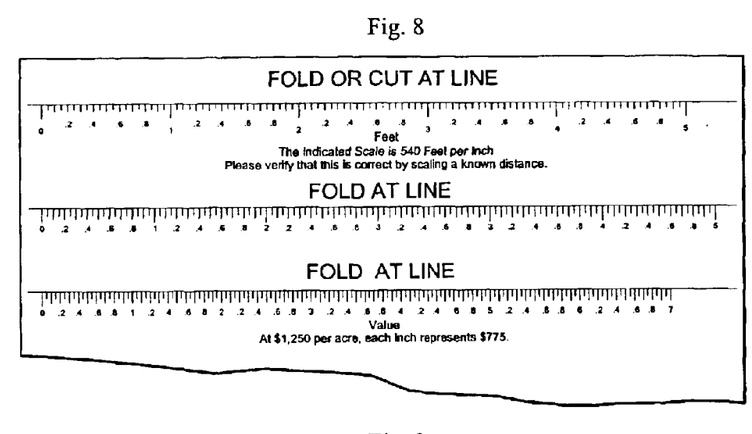
FIG. 8 shows a portion of another typical scale instrument and conversion tool which has been printed by the method and process. It has a scale of 1 inch=540 feet on the upper scale, 1 inch=0.62 acres on the middle scale, and 1 inch= $750 on the lower scale. It could have been produced in a variety of scale ratios.
Figure 15:
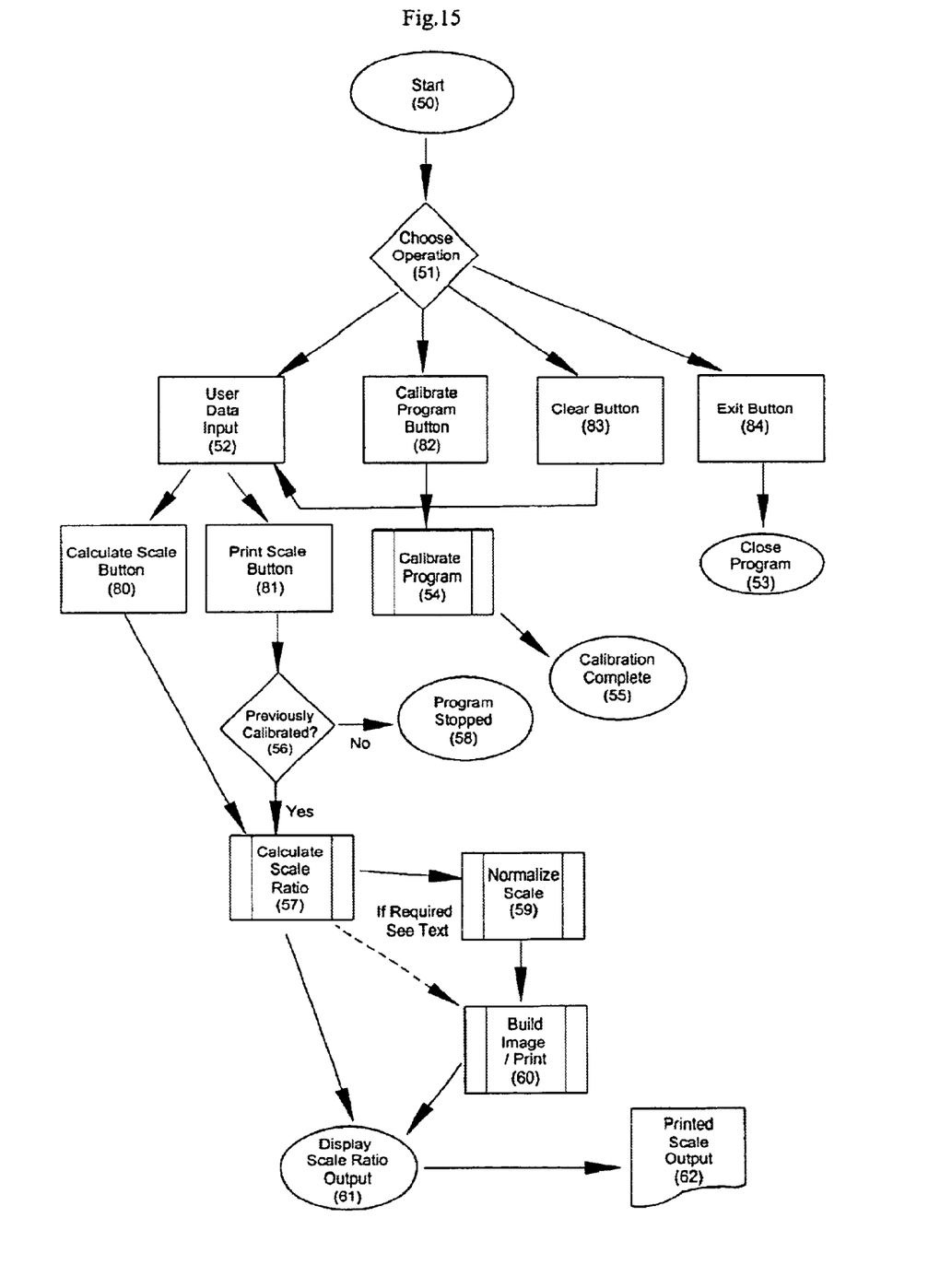
FIG. 15 shows a flow chart of the method and process.

A flowchart of the preferred embodiment of the program is shown as FIG. 15. When the program is initiated 50, a User Interface Form such as shown in FIG. 4 is projected onto the computer monitor screen. In the preferred embodiment, this interface has five buttons, two data entry fields, and one data display field. The user can: a) enter data into the Measured Distance Entry Window 85 and the Known Distance Entry Window 86, in which case two additional alternatives—the Calculate Scale Button 80, and the Print Scale Button 81—can be utilized as indicated below, b) calibrate the program to the printer by pressing the Calibrate Program Button 82, c) clear the Measured Distance Entry Window 85, the Known Distance Entry Window 86, and the Display Scale Window 87 by pressing the Clear Button 83 or d) exit the program by pressing the Exit Button 84. The functions relating to clearing the data fields and exiting the program are well known programming techniques and no claim is made regarding them. The User Interface Form shown as FIG. 4 is only one example of the many possibilities for such form which can be utilized. This process and method also anticipates that other formats will be used and that some User Interface Forms will allow for the input of additional data, depending on which type of instrument is to be printed.

Having measured the length of a line whose distance in the real world is known, that length is entered into the Measured Distance Entry Window 85 and the distance which is represented by that line is entered into the Known Distance Entry Window 86. If the user wishes to calculate the scale ratio of a drawing, etc., he or she will push the Calculate Scale Button 80 and the program will determine the scale by solving the equation below within the Calibrate Scale Module 57.

Scale=Distance Represented by the Line/Measured Length of a Drawn Line

The result is shown in the Display Scale data window 87. It is clear that an optional embodiment of the invention may allow the user to directly input the scale based upon calculating or otherwise obtaining it outside purview of the program and it is not intended that the input of data be limited to any one specific method or set.

Figure 1:
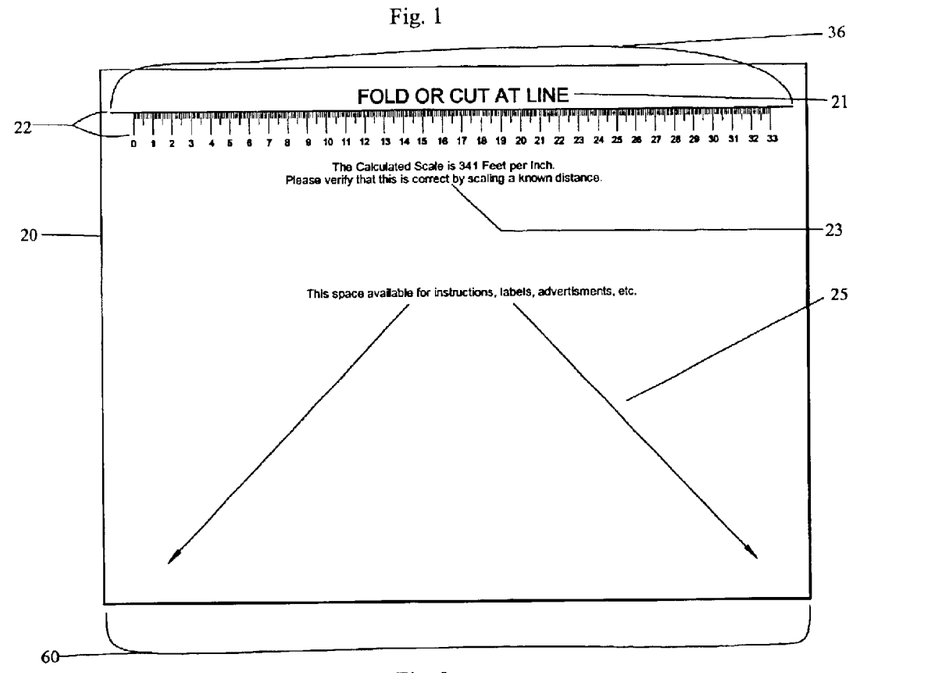
FIG. 1 shows a typical scale instrument which has been printed by the method and process. It has a scale of 1:341 but could have been produced in a variety of scale ratios.
Figure 9:
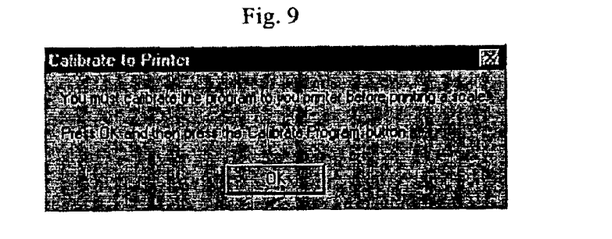
FIG. 9 shows an embodiment of a user interface alert box which indicates the program has not been calibrated to the printer.

If the user wishes to print a scale instrument such as shown in FIG. 1, he or she will push the Print Scale Button 81 and the program will first determine if the program has been calibrated to the printer. If it has not been, an alert box such as the one shown in FIG. 9 is displayed on the monitor and the program stops 58. The calibration function is discussed below. Assuming the program has been calibrated, the scale will first be calculated as indicated above in the Calculate Scale Module 57. Under some embodiments of the invention, it may be preferable to limit the user to a certain arbitrary range of scale ratios. This has the advantage of alerting the user to possible error when the range falls outside what might be expected under certain applications. Moreover, if the range of scale which will be accepted by the program exceeds the capacity of the program and printer to print distinct and legible lines, the scale ratio must be normalized so that all scales used in the Image Building/Print Module 60 in are within a specified range which can be printed. This is feasible because a scale instrument can be used with equal facility with drawings whose scale is multiplied or divided by a factor of ten or some multiple thereof. Thus, the 1:40 scale on a common Engineer's Scale can be used with drawings having scales of 1"=40' or 400' or 4,000', etc. Normalization is accomplished within the Normalize Scale Module 59 by multiplying or dividing a calculated scale ratio which is not within the specified range by some factor of 10 so as to bring it to the desired range. For example, if the calculated scale were 1"=3.4' and the specified scale range was equal to or greater than 100 and less than 1,000, the scale ratio would be multiplied by 100 to determine the normalize scale. If the calculated scale were 1"=34,000', the scale ratio would be divided by 100 to determine the normalized scale.

In other embodiments, normalization of the scale is not required because it will have been predetermined that the limits of the ranges accepted by the program will allow any scale in that range to be legibly printed without normalization. In that case, that portion of the program flow chart shown in FIG. 15 will be applicable and the program will flow directly from the Calculate Scale Module 57 to the Build Image/Print Module 60 as indicated by the dashed line with arrow.

Having normalized the data if required, the program begins the print routine in the Build Image/Print Module 60. Computer programs can be designed to release data to the printer as it is developed within the program or, in certain computer operating systems, can be held in the computer's memory and released at a single step. In the preferred embodiment of the invention, the latter method is utilized, but there is no intention of limiting the description to either method. Within the ImageBuild/Printing Module 60, the program creates lines 22, and alpha numeric labels 21, 23, and 25 which when printed create the scale instrument in the scale ratio determined. First, the program creates the user instruction label "Fold or Cut at Line" 21 near the top edge of the media 20. Folding or cutting the media close to this line allows the user to accurately place the Index Line 32 immediately adjacent to a given point on a scaled drawing, etc. and to read the position on the scale instrument of the point which the user desires to measure. Transparent media alleviates the need to cut or fold and the instructions could be deleted from such media. Then the program prints the Base Line 30 immediately below the "Fold or Cut at Line" label. This serves as the upper limit of the scale instrument on the media and assists in positioning the scale instrument on and manipulating it across drawings, etc. Then the much shorter Index Line 32 is drawn perpendicular to Base Line near the left terminus of said line and an Index Number "0" 34 is positioned beneath it.

The scale markings or lines on a scale instrument, by definition, divide the instrument into a series of major intervals—referred to below as the Linear Distance of One Hundred Units—each of which is subdivided into smaller minor intervals (with yet smaller subdivisions possible). Specifically, the program next determines the Linear Distance of One Hundred Units by solving this equation.

Linear Distance of One Hundred Units=100/Normalized scale*Calibration Factor

The determination of the Calibration Factor is described below.

The next step is to determine the number of one hundred unit increments, at the scale ratio being used, which can be placed on the Available Horizontal Media Distance 36 by solving the equation below and rounding the result down to integer value. The Available Horizontal Media Distance is the width of the media 20, reduced by some factor to compensate for the fact that many current printers cannot print on the extreme edge of the media. It may be determined specifically for a given printer or may be sit at the limit of the least effective printer a user is likely to encounter. One hundred units is a common increment but other numbers of units can be used.

Number of one hundred unit increments=Available Horizontal Media Distance/Linear Distance of One Hundred Units Computer programs use spacing units to direct where on the media page the printer will be directed. To determine the number of spacing units which will equal the Linear Distance of One Hundred Units, the following equation is solved.

Number of spacing units required for Linear Distance of One Hundred Units=Number of spacing units per inch*Linear Distance of One Hundred Units This assumes the Linear Distance of One Hundred Units is calibrated in inches. Other measurement systems could be used. In the preferred embodiment, the spacing unit is the twip and the number of spacing units per inch is 1,440. Other systems could be used.

Figure 2:
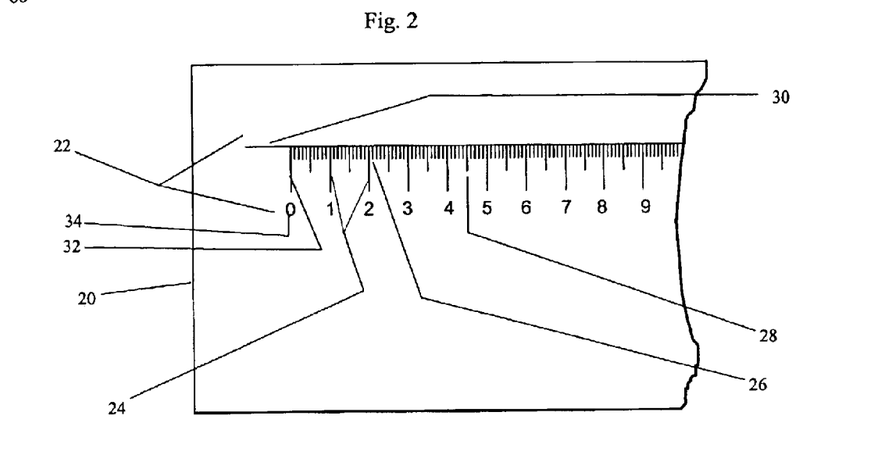
FIG. 2 shows an enlarged portion of the scale instrument shown in FIG. 1.
Figure 3:
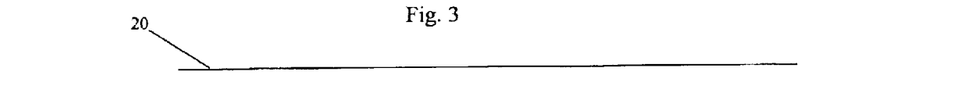
FIG. 3 shows a profile view of the printed scale instrument printed by the method and process.

The printer is next instructed to print a short line 26 perpendicular to the Base Line and spaced one tenth of the Linear Distance of One Hundred Units (or one fifth or some other subdivision convenient to the scale being printed) to the right of the Index Line 32. Additional short lines are sequentially placed perpendicular to the base line at one tenth (or some other factor) of the Linear Distance of One Hundred Units to the right of the previous line until nine (in the case of tenths) such lines have been made. It is customary to show the fifth perpendicular line 28 somewhat longer than the adjacent lines so as to highlight the one half mark of the Linear Distance of One Hundred Units. In the preferred embodiment, the scale is printed with one tenth subdivisions if the normalized scale is 1:500 or less and with one fifth subdivisions otherwise. While not indicated in the embodiments shown herein, the program can be easily modified to allow the user to choose the subdivision scheme at the time of use. When the last short line indicating the last subdivision mark of one Linear Distance of One Hundred Units has been printed, the program instructs the printer to space the final distance to the right required to complete the Linear Distance of One Hundred Units, to draw another line of the same length as the Index Line 32 perpendicular to the Base Line 30, and beneath it, to print the number "1" indicating that it is the position of the first one hundred units. This printing of tenths (or some other subdivision) and units of Linear Distance of One Hundred Units, with numbers printed below, is continued for the number of complete one hundred unit increments that has been determined will fit the Available Horizontal Media Distance 36. In the case of the preferred embodiment, the numbers printed beneath the lines indicating the end of the Linear Distance of One Hundred Units are integers, but under different embodiments, tenths, tens, hundreds, etc., or combinations thereof could be used. Also, depending on the spacing of the Linear Distance of One Hundred Units, it may be preferable to print only some of these numbers to enhance legibility.

In the preferred embodiment, the calculated scale ratio and instructions 23 is printed below the scale instrument. The balance of the media surface may be utilized for user instructions, labels, advertising, etc 25.

It should be obvious that a competent programmer could develop a number of ways to effectuate the printing of the scale instrument and this application is intended to be inclusive of such variations. Scale instruments having two or more scales such as those shown in FIGS. 5 through 8 are developed in a similar fashion. After the top scale has been printed, the second and additional scales are printed by defining the Linear Distance of One Hundred Units for each of the additional scales and printing subdivisions starting from an index line which lies the same distance from the margin of the media 20 as the top scale.

Figure 10:
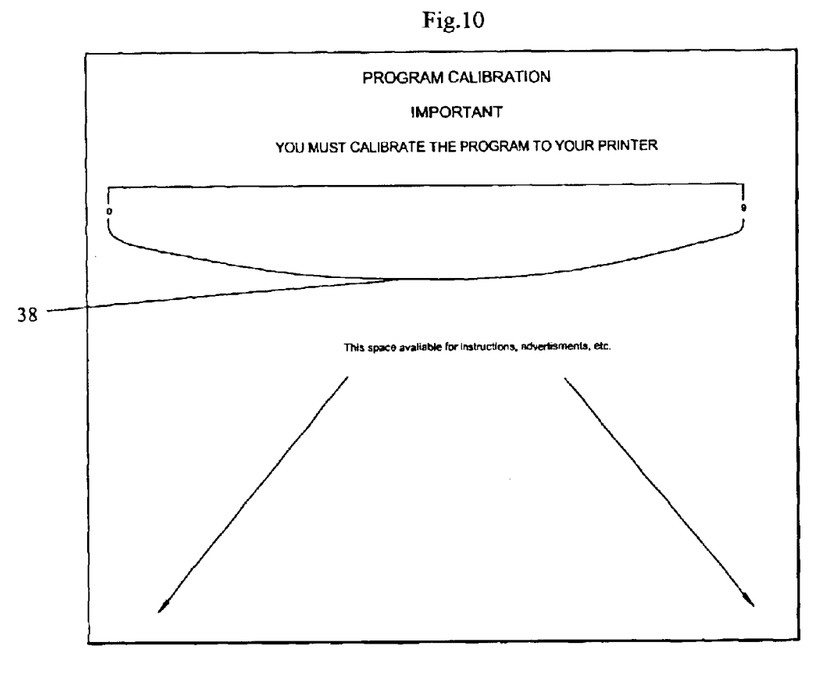
FIG. 10 shows a calibration sheet which has been printed by the method and process.
Figure 11:
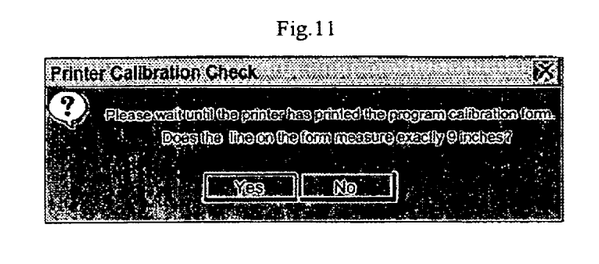
FIG. 11 shows an embodiment of a Printer Calibration alert box.
Figure 12:
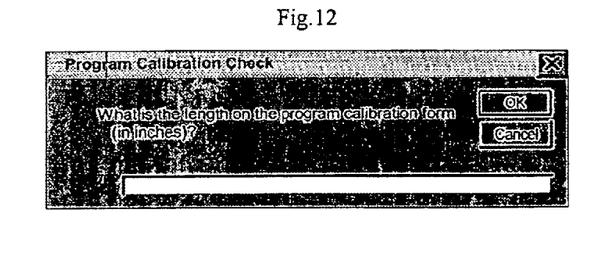
FIG. 12 shows an embodiment of the Program Calibration Test alert box.

Because the printer's mechanical parts are subject to variance and wear, and/or because the specific computer/printer combinations may vary from others in the way they respond to instructions, calibration of the process to fit a specific computer/printer combination is required prior to use. The calibration process is initiated by pushing the Calibrate Program Button 82 on the User Interface Form FIG. 4. The Calibrate Program Module 54 causes the printer to print a Program Calibration Form such as that shown in FIG. 10 with a Calibration Line 38 of a known length, adjusted by the Calibration Factor (which will be set to "1" the first time the program is run) based upon the provisions in the programming language for instructing the printer peripheral as to the position of lines. FIG. 10 shows a Calibration Line 38 which is has been printed at 12,960 twips, or 9 inches. A Printer Calibration Check alert box such as the one shown in FIG. 11 is then projected on the monitor screen. The box instructions the user to measure the Calibration Line to determine if it is exactly 9 inches. If the Calibration Line 70 length is correct at 9 inches, nothing needs to be done and the Calibration Factor remains at 1. If not, the user is instructed to input the actual length of the line via the Program Calibration Test alert box, an embodiment of which is shown as FIG. 12. It should be obvious that the use of a 9 inch line is arbitrary and any length in any system of measurement would work equally as well to determine how the printer is printing a given instruction and calibrating the process to that printer. The Calibration Factor is determined by solving the following equation:

Calibration Factor=9/Measured Length of the Calibration Line

Figure 13:
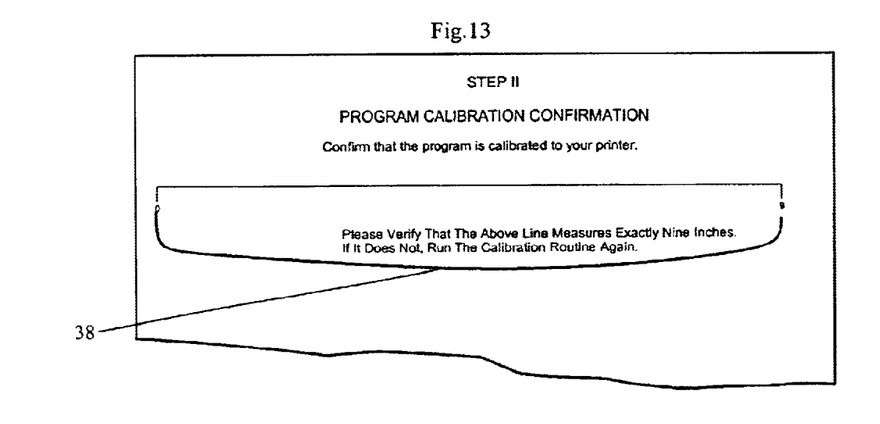
FIG. 13 shows a second calibration sheet verification sheet.

The program then prints a Step II Program Calibration Confirmation such as shown in FIG. 13 with a Step II Calibration Line 40, the length of which is determined by the following:

Step II Calibration Line=9 inches*1440 twips per inch*Calibration Factor

Figure 14:
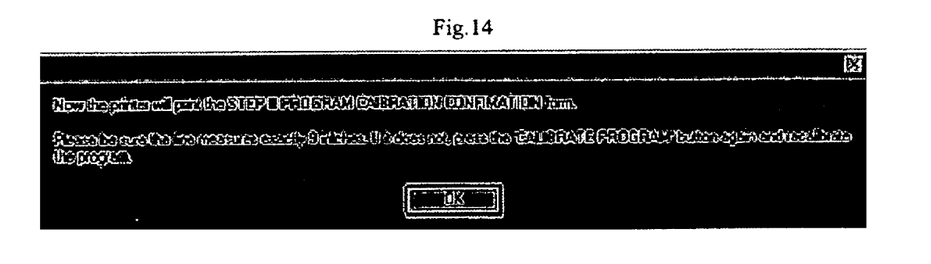
FIG. 14 shows an embodiment of a user interface alert box used to instruct the user to confirm that the calibration is correct

At this time, a Step II alert box, such as that shown as FIG. 14, projected on the monitor screen and instructs the user to confirm that the computer is adequately rendering a line of the desired length by measuring the Step II Calibration Line 40 and confirming it's length is equal to 9 inches (or whatever length was printed). If this is the case, the program is calibrated to that printer and the calibration factor is written to a specified location in the memory. If the line is not exactly nine inches long, the user will again input the length until, through the iterative process indicated, the program becomes calibrated to the printer. It will be obvious to one skilled in the art of computer programming that there are a variety of similar methods which will accomplish the task to calibration, each involving the verification of actual output based upon the program's printing some test output and the modification by some calibration factor.

Conclusion, Ramifications, and Scope

The scale instruments generated by this invention represent a significant advantage over prior art for those work with drawings, maps, aerial photographic, graphs, etc. which, while having a consistent internal scale, are not prepared at one of the typical scale ratios which match those scale instruments which are generally available commercially. So long as a user can find and measure a line in one of such drawings, etc., he or she can use the method and process described here to print a scale instrument which will have the same scale ratio as the drawing and use that instrument to determine other distances within the drawing.

Although the description above contains many specifics, these should not be construed as limiting the scope of the invention, but merely as providing illustrations of some of the preferred embodiments of the invention. Thus the scope of the invention should be determined by the appended claims and their legal equivalents, rather than by the examples given.

I claim:

1. A process and method for printing a scale instrument on paper or other media utilizing a general purpose computer and computer printer of known type, comprising:
   a user interface projected on a computer monitor of known type which enables a user to:
     input the measured length of a line in a scaled drawing, etc., which represents a known distance in the real world, and,
     input the known distance represented by such line, and,
     initiate printing of a scale instrument, and,
   initiate a calibration routine to provide a calibration factor for use with a given computer printer combination; and,
   a means to cause the printer to print a test line of a defined length so as to determine the printer's response to instructions regarding the spacing of lines; and,
   a user interface instructing the user to:
     measure said test line to determine if it is the same length as the defined line, and,
     indicate via a user interface if the test line's measured length is the same as the defined line, and,
     accept input of the line's actual length if it is not the same as the defined line; and,
   a means to cause the printer to print a base line which extends substantially across one side of the media; and,
   a means to cause the printer to print an index line which is perpendicular to such base line and near the edge of the media; and
   a means to label such index line with a printed "0" directly below such index line; and,
   a means to print a series of regularly spaced lines, perpendicular to the base line and to the right of the index line such that:
     a portion of which lines are shorter than the index line and are set off sequentially to the right of the index line with spacing between them such that each line demarks one equal portion of that distance which is equal to the length of one hundred units at the scale determined by this method and process, as adjusted by the calibration factor, and,
     a portion of which lines are shorter than the index line but longer than those lines described immediately above and each are set off, sequentially, to the right of the index line and from each other, a distance equal to the length of one hundred units at the scale determined by this method and process, as adjusted by the calibration factor; and,
   a means to print numbers beneath each line which represents the length of one hundred units, which numbers will be in consecutive sequence beginning with one; and,
   a means to cause instructions and other data to be printed on the media; and,
   whereby said lines and instructions will together constitute a scale instrument denominated by the specified scale ratio, and,
   whereby a user can manipulate such scale instrument across scaled drawings, maps, aerial photographs, graphs and similar documents, and,
   whereby a user can determine the amount of distance represented by any line or space in the drawing, etc., and,
   whereby a user can mark up the drawing with lines of varying lengths which represent specified distances at the scale of the drawing, etc., which are known by virtue of the scale instrument.

2. A process and method for printing a scale instrument on paper or other media utilizing a general purpose computer and computer printer of known type, comprising:
   a means to calculate a scale ratio of a scaled drawing, etc, by dividing the distance in the real world represented by a line by the measured length of such line; and,
   a means to calculate a calibration factor for each specific computer/printer combination by dividing:
     the length of a line which has been printed to be a pre-defined length by
     the actual measured length of said line; and,
   a means to normalize the calculated scale ratio if it is not within a range which can be legibly printed by the computer/printer combination by either multiplying or dividing said calculated scale ratio by such factor of ten as will bring it within said range; and,
   a means to calculate the linear distance of one hundred units at the calculated scale, as adjusted by the calibration factor, by,
     dividing 100 by,
     the normalized scale ratio, and,
     multiplying that amount by the calibration factor; and,
   a means of determining the number of complete one hundred unit increments, as determined above, which will fit on a sheet of media, given that computer printers do not generally print on one hundred percent of the media surface, by:
     dividing the available horizontal media distance by,
     the linear distance of one hundred units, as determined above, and,
     rounding the result down to the nearest integer; and,
   a means to utilize the number of spacing units utilized by the computer programming language of known type to instruct the computer of known type as to the spacing of distances between lines and the placement of lines on the media surface which is required to define the linear distance of one hundred units as determined above; and,
   a means to store the results of each of the above calculations in computer memory; and,
   a means to determine a convenient subset of the linear distance of one hundred units as determined above which will make up the smallest increment shown on the finished scale instrument; and,
   a means to determine, based on the subset noted immediately above, the number of spacing units necessary to define the distance of such subset; and,
   a means to instruct the printer to space to the right from the previously described index line by an amount equal to the spacing units which define such subset of the linear distance and draw a short line perpendicular to the base line; and,
   a means to instruct the printer to space to the right an equal distance from the last described line as was spaced from the index line and to draw another short line perpendicular line; and,
   a means to instruct the printer to sequentially print such equally spaced lines until the printer has spaced the total number of spacing units to a position which will complete a full complement of lines, the space of which together constitute the linear distance of one hundred units at the specified scale ratio as determined above; and, the means to instruct the printer at that point to draw a longer line to the right of the line last placed and perpendicular to the base line; and, the means to instruct the printer to space below the line slightly and place a "1" to indicate that location is equivalent to the linear distance of one hundred units as determined above; and, the means to instruct the printer to continue the sequence described above in spacing subsets of the linear distance of one hundred units and labeling each complete set of the linear distance of one hundred units until the number of such complete sets is equal to the integer value indicated above as the maximum number of compete sets which fit the media; and, the means to instruct the printer to printer instructions and other material on the balance of the media.

3. The process and method of claim 1 comprising:

media which can be cut or folded immediately above the base line, whereby this will allow the printed scale instrument to be manipulated across a drawing, etc.; and, whereby the index line can be accurately placed immediately adjacent to a point which a user wishes to measure from; and, whereby the user can accurately align the scale instruments adjacent to another location within the drawing, etc., so as to read the distance between the index mark and such other location.

4. The process and method of claim 1 comprising:

a user interface to solicit one or more elements of subsidiary data from the user which data has a mathematical relationship with the distance shown on a scale, and, a means to cause the printer print a secondary base line for each such element of subsidiary data, which line(s) extend substantially across the media in the vicinity of the original base line, and, a means to cause the printer to print an index line perpendicular to each secondary base line near the margin of the media, and, a means to label such index line(s) with a "1" printed directly below such line(s), and, a means to print a series of regularly spaced lines, perpendicular to each secondary base line and to the right of each index line such that:

a portion of which lines are shorter than the index line and are set off sequentially to the right of the index line with spacing between them such that each line demarks one equal portion of that distance which is equal to the length of a specified unit or group of units measured with respect to one element of subsidiary data input, as adjusted by the calibration factor, and, a portion of which lines are shorter than the index line but longer than those lines described immediately above and are set off sequentially to the right of the index line and then from each succeeding line a distance equal to the length of a specified unit or group of units measured with respect to each element of the subsidiary data input, and, a means to print numbers beneath each line which represents the length of a specified unit or group of units measured with respect to one element of the subsidiary data input, which numbers will be in consecutive sequence beginning with one; and, a means to cause instructions and other data which is specific to the secondary scales to be printed on the media.

5. The process and method of claim 2 comprising:

a means to input one or more elements of subsidiary data, which data has a mathematical relationship with the distance shown on the scale; and, a means to calculate the linear distance represented by the length of a specified unit or group of units measured with respect to one element of the subsidiary data input; and, a means of determining the number of complete lengths of a specified unit or group of units measured with respect to each element of the subsidiary data input which will fit on the sheet of media, given that computer printers will not generally print one hundred percent of the media surface by:

dividing the available horizontal media distance by, the linear distance represented by the length of a specified unit or group of units measured with respect to each element of the subsidiary data input, and, rounding the result down to the nearest integer; and, a means to utilize the number of spacing units utilized by the computer of known type to instruct the computer as to placement of lines on the media which is necessary to define the linear distance represented by the length of a specified unit or group of units measured with respect to each element of the subsidiary data input as adjusted by the calibration factor; and, a means to store the results of each of the above calculations in computer memory; and, a means to determine convenient subset(s) of the linear distance represented by the length of a specified unit or group of units measured with respect to one element of the subsidiary data input which will make up the smallest increment shown on each secondary scale instrument printed; and, a means to instruct the printer to space to the right from each of the previously described index line(s) by an amount equal to the subset of the linear distance represented by the length of a specified unit or group of units measured with respect to one element of the subsidiary data input and draw a short line perpendicular to the base line; and, a means to instruct the computer to instruct the printer to space to the right an equal distance from the last described line(s) as was spaced from the index line and to draw another short line perpendicular line(s); and, a means to instruct the printer to sequentially print such equally spaced lines until the printer has spaced to a position which will complete the full complement of lines, the space of which together constitute the linear distance represented by the length of a specified unit or group of units measured with respect to one element of the subsidiary data input; and, the means to instruct the printer at that point to draw a longer line to the right of the line last placed and perpendicular to the secondary base line(s); and, the means to instruct the printer to space below the line slightly and place a "1" to indicate that location is equivalent to the linear distance represented by the length of a specified unit or group of units measured with respect to one clement of the subsidiary data input; and, the means to instruct the printer to continue the sequence described above in spacing subsets of the linear distance represented by the length of a specified unit or group of units measured with respect to one element of the subsidiary data input and labeling each complete set of the linear distance represented by the length of a specified unit or group of units measured with respect to one element of the subsidiary data input until the number of such complete sets is equal to the integer value indicated above as the maximum number of complete sets which fit the media.

* * * * *